(12) United States Patent
Li (10) Patent No.: US 6,358,059 B1
(45) Date of Patent: Mar. 19, 2002

(54) METHOD AND APPARATUS FOR TEACHING RAPID DECODING (READING) AND ENCODING (SPELLING)

(76) Inventor: Ruyun Li, 2659 C. Hydraulic Rd., Charlottesville, VA (US) 22901

( * ) Notice: Subject to any disclaimer, the term of this patent is extended or adjusted under 35 U.S.C. 154(b) by 0 days.

(21) Appl. No.: 09/616,450

(22) Filed: Jul. 14, 2000

Related U.S. Application Data (63) Continuation-in-part of application No. 09/134,443, filed on Aug. 14, 1998, now abandoned.
(60) Provisional application No. 60/055,803, filed on Aug. 15, 1997.

(51) Int. Cl.[7] .............................................. G09B 25/00
(52) U.S. Cl. ...................... 434/402; 434/167; 434/173; 434/174; 434/206
(58) Field of Search .............................. 434/167, 173, 434/172, 174, 197, 198, 206, 215, 402, 405, 404

(56) References Cited

U.S. PATENT DOCUMENTS

| | | | | |
|---|---|---|---|---|
| 259,920 A | * | 6/1882 | Reiff ........................... | 434/174 |
| 1,506,210 A | * | 8/1924 | Welty .......................... | 434/174 |
| 1,581,923 A | * | 4/1926 | Frome ......................... | 434/174 |
| 2,322,564 A | * | 6/1943 | Buckley et al. ............. | 434/174 |
| 2,370,229 A | * | 2/1945 | Buckley ...................... | 434/174 |
| 4,643,680 A | * | 2/1987 | Hill ............................. | 434/170 |

\* cited by examiner

Primary Examiner—Kien T. Nguyen
Assistant Examiner—Bena B. Miller
(74) Attorney, Agent, or Firm—Sheldon H. Parker (57) ABSTRACT

The present invention discloses a method and tools for teaching rapid and accurate decoding and encoding words. In decoding (reading), the invention delineates the concept of sound units (a combination of blendable letter sounds) and their use to accurately decode words systematically and efficiently. In encoding writing or making words), the invention utilize a combination of wheels to help children with limited motor skills to easily and accurately encode thousands of words and word like combinations so as to learn and familiarize themselves with words and their structures. The same wheels can also be used to create math wheels and sorting wheels that can train children's early math skills in adding, deducting, multiplication, subdivision, and other important abilities.

8 Claims, 12 Drawing Sheets

Figure 4 b + a = ba        n + a = na
c + a = ca        p + a = pa
ch + a = cha      r + a = ra
d + a = da        s + a = sa dr + a = dra      sh + a = sha
f + a = fa        t + a = ta
g + a = ga        th + a = tha
h + a = ha        tr + a = tra j + a = ja        v + a = va
k + a = ka        w + a = wa
l + a = la        z + a = za
m + a = ma

Long vowel word wheel

| b | a | b |
|---|---|---|
| c |   |   |
| k |   | ck |
| d |   |   |
| f |   | d |
| g | e |   |
| h |   | ff |
| j |   |   |
| l |   | g |
| m |   |   |
| n | i | ll |
| p |   |   |
| qu |   | m |
| r |   |   |
| s |   | p |
| t | o |   |
| v |   | t |
| w |   |   |
| y |   | s |
| z |   |   |
| ch | u | ss |
| sh |   | sh |
| tr |   |   |
| dr |   |   |
| th |   | ch |

| b | a | b |
|---|---|---|
| c |   |   |
| k | an | k |
| d |   |   |
| f |   | ck |
| g | e |   |
| h |   | d |
| j | en |   |
| l |   | ff |
| m |   |   |
| n | i | g |
| p |   |   |
| qu | in | ll |
| r |   |   |
| s |   | m |
| t | o |   |
| v |   | p |
| w | on | s |
| y |   |   |
| z |   | ss |
| ch | u | t |
| sh |   | x |
| tr | un | sh |
| dr |   | ch |
| th |   | tch |
|   |   | dge |

| | | | |
|---|---|---|---|
| b | b | a | b |
| c | c | an | ck |
| | k | | k |
| | d | | d |
| f | f | e | ff |
| | g | | ll |
| g | gu | en | m |
| | h | | p |
| p | j | i | s |
| | l | | ss |
| s | m | in | ff |
| | n | | t |
| t | p | o | x |
| | qu | | sh |
| sh | r | on | ch |
| | wr | | tch |
| th | s | u | dge |
| | t | | lt |
| | v | un | st |
| | w | | sp |
| | wh | | sk |
| | y | | lk |
| | z | | mp |
| | ch | | lf |
| | sh | | ct |
| | tr | | pt |
| | dr | | ld |
| | th | | |

| | | | |
|---|---|---|---|
| b | b | a | be |
| | c | ai | ce |
| c | k | ay | de |
| | d | | fe |
| f | f | e | ge |
| | ph | | ke |
| g | g | ee | le |
| | gu | ea | me |
| p | h | ee | ne |
| | j | | pe |
| | l | | re |
| | m | i | se |
| t | n | igh | te |
| | kn | ie | ve |
| sh | p | y | ze |
| | qu | | l |
| th | r | | m |
| | wr | o | n |
| | s | oa | d |
| | t | ow | t |
| | w | | k |
| | ch | | ch |
| | sh | u | p |
| | tr | ew | x |
| | dr | ue | st |
| | | | nd |
| | | | ld |
| | | | ll |

| | | | |
|---|---|---|---|
| b | b | ar | b |
| | c | | d |
| c | k | or | f |
| | d | au | k |
| f | f | aw | l |
| | g | | ll |
| g (68) | h | ir | m |
| | j | ur | n |
| p | l | or | p |
| | m | | r |
| s (82) | n | ou | s |
| | p | ow | ss |
| t | qu | | t |
| | r (84) | oo | x |
| sh | s | ew | ce |
| | t | u | ge |
| th | v | | se |
| | w | air | ve (86) |
| | y | ear | ze |
| | z | are | ch |
| | ch | | sh |
| | sh | eer | th |
| | tr | ear | |
| | dr | oi | |
| | th | oy | |

Fig. 15

| b | b | a | b | t |
|---|---|---|---|---|
| | c | | c | |
| c | k | an | k | p |
| | d | | ck | |
| f | f | | d | k |
| | g | e | f | |
| g | gu | | ff | f |
| | h | en | g | |
| 68 | | | l | |
| 88 — p | j | | ll | d |
| | l | | m | |
| 90 — s | m | i | p | |
| | n | | r | |
| 92 — t | p | | s | |
| | qu | in | ss | |
| sh | r | | t | |
| | wr | | x | 94 |
| th | s | o | sh | |
| | t | | ch | |
| | v | on | tch | |
| | w | | dge | |
| | wh | u | th | |
| | y | | ce | |
| | z | un | se | |
| | ch | | ve | |
| | sh | | tr | |
| | | | dr | |
| | | | th | |

Fig. 16

| b | b | a | b | |
|---|---|---|---|---|
| | c | ai | c | e |
| c | k | ay | d | |
| | d | | f | d |
| f | f | | g | |
| | ph | e | k | t |
| g | g | ee | l | |
| 68 | gu | ea | ll | |
| p | h | ee | m | |
| 96 — | j | | n | |
| s | l | | | |
| 98 — | m | i | p | |
| | t | | r | |
| | n | igh | | |
| | kn | ie | s | |
| 100 — sh | p | y | t | |
| | qu | | x | |
| th | | | th | |
| | r | | ch | |
| | wr | o | | |
| | s | oa | | |
| | t | ow | se | |
| | w | | ve | |
| | ch | | ze | |
| 102 — sh | u | | | |
| tr | ew | | | |
| tr | ue | | | |

METHOD AND APPARATUS FOR TEACHING RAPID DECODING (READING) AND ENCODING (SPELLING)

CROSS-REFERENCE TO RELATED PATENT APPLICATIONS

This application is a continuation in part of U.S. application Ser. No. 09/134,443 filed Aug. 14, 1998 now abandoned, which application claims the benefits under 35 U.S.C. 119(e) of provisional patent application Ser. No. 60/055,803, filed Aug. 15, 1997. This application incorporates by reference, as though recited in full, the disclosure of provisional application No. 60/103,285 and co-pending application Ser. No. 09/134,443.

BACKGROUND OF THE INVENTION

1. Field of the Invention

The present invention generally relates to a method using Sound Units (blendable letter sounds) and a combination of wheels to teach children or adults to quickly learn to read (decode) and write (encode) in English. The same wheels can also be used to help children master basic math skills and other important abilities.

2. Brief Description of the Prior Art

To learn to read, children have to be able to do both decoding (reading) and encoding (writing). In decoding, children have to understand what each combination of letters in a word represents so as to understand what that word is. In encoding, children have to be able to use the same combination of letters to formulate words so as to communicate their meaning to others.

There are problems in both encoding and decoding in the current methods used to teach reading. In decoding, after children have learned letter sounds in English, they have to use their learned letter sounds to decode words. In teaching children to use letter sounds to decode words, one critical problem remains unresolved, resulting in over 30% of children having difficulty in learning to read. That is how to help every child learn to blend letter sounds together efficiently and accurately without causing such a high percentage of children experiencing learning difficulties.

This problem is reflected in publications and books which address the problem. Under the title of "Educators Still Disagree on How to Teach Reading (May 11, 1997), a New York Times reporter wrote: "When 15,000 reading teachers and education professors gathered last week against the backdrop of the increasingly politicized debate over reading instruction, there was little consensus about the crucial issue of the best way to teach children to read." "For the most part, though, the hundreds of seminars and lectures offered last week focused on how reading teachers could do their jobs better. Virtually all the presentations drew standing-room-only audiences, underscoring the fact that 40 percent of the nation's third-graders cannot read independently and that no educator has quite figured out how to solve the problem."

In "30 Years of Research: What We Now Know About How Children Learn to Read" by Bonita Grossen, a research associate with The National Center to Improve the Tools of Educators, the author gives this instruction on how to help children learn to decode words: "After children have learned two or three sound-spelling correspondences, begin teaching them how to blend the sounds into words. Show them how to move sequentially from left to right through spellings as they 'sound out,' or say the sound for each spelling."

The disclosed system overcomes the problems with the prior art approaches. First, a basic distinction between blendable and unblendable letter sounds is not made among teachers and professionals—a key step in deciding the failure and success of virtually every child in their efforts to learn to read. Children are just given the ambiguous instruction to blend all letter sounds together in order to decode a word rather than being taught which letter sounds are blendable and which ones are not. Without this knowledge, children are left by themselves to figure that out. Those who can go on learning to read with great success, those who cannot get stuck at the mercy relying on sight words to survive.

Second, it is extremely inefficient to decode words by "saying the sound for each spelling", especially when it comes to multi-syllable words. It simply overwhelms children's short-term memory by saying the sound of each spelling.

Third, a weakness in "saying the sound for each spelling" in order to decode a word is that it does not sound like a word when trying to say each sound. That is why so many teachers complain that even though their children have learned phonics they still cannot read words.

In encoding, a major difficulty for beginning learners, especially very young children, is the limited development of their motor skills in handling pens, pencils or even keyboards. Thus, they are deprived of many opportunities and experiences in manipulating letters to explore the vast and complex structures of the language. Without such opportunities and experiences, the time they need to understand and master the structure and formation of words is greatly extended.

Solving these two problems—blending letter sounds together effectively and efficiently to decode words and giving children the ability to easily and efficiently encode words—will have a tremendous impact on their abilities to learn to read.

SUMMARY OF THE INVENTION

The disclosed system teaches the use of sound units which have successfully solved the most difficult part of reading—the blending of letter sounds in decoding words. Further, the system teaches the use of a combination of wheels to help children encode words easily and efficiently before their motor skills catch up. The same combination of wheels can also be used to teach basic math skills including adding, deducting, multiplying, and subdividing.

The use of sound units to decode words comprises three major steps. Children are taught how to distinguish between blendable and unblendable letter sounds. They are then taught how to blend the blendable letter sounds into sound units. Finally, children are taught how to add beginning and ending consonants to sound units to decode or encode words.

The word wheels disclosed herein provide a physical means for children to create words. Each Word wheel has three to five wheels with letters on each wheel. A child can create thousands of single syllable and multi-syllable words by simply turning each wheel.

The math wheels disclosed herein provide a physical means for children to solve basic math problems. Each Math wheel has three wheels with numbers on each one. A child can solve each problem by turning the wheels. The sorting wheels disclosed herein provide a physical means for children to sort and categorize shapes, letters, numbers, animals, plants, people, and many other things into different groups according to their internal and external features and characteristics.

BRIEF DESCRIPTION OF THE DRAWINGS

The advantage of the instant disclosure will become more apparent when read with the specification and the drawings, wherein.

DETAILED DESCRIPTION OF THE INVENTION

The disclosed system has been divided into four parts to simplify explanation and to coordinate with the actual teaching style. Part I is how to teach the 44 letter sounds and is necessary as an integral part of the invention to complete the whole process of teaching accurate and effective decoding and encoding abilities to children. Part II gives the detailed description on how the discovery of sound units makes decoding easy and effective by solving the difficulty in blending individual letter sounds in order to decode a word. Part III describes how to use a combination of wheels to give children the power to easily and efficiently encode hundreds and thousands of words by simply turning a less wheels. Part IV describes how to use a combination of wheels to give children an easy and fun way to solve basic math problems.

Part I—Letter Sounds

The traditional way of teaching letter sounds is to teach them in the order of the alphabet: a, b, c, d, e, f, g, h, i, j, k, l, m, n, o, p, q, r, s, t, u, v, w, x, y, z. That is very inefficient because these 26 letter sounds and the 26 phonograms that represent these 26 letter sounds do not give a child necessary tools to quickly become an independent decoder and speller. After learning these 26 letter sounds, there are still too many unknown variables in their efforts to decode and encode words.

In general, in English there are around 44 sounds and over 70 ways to represent these 44 sounds. In the disclosed system these 44 letter sounds are divided into consonant letter sounds and vowel letter sounds. The term consonant letter sounds and vowel letter sounds are used to differentiate between the sound the letter and the correct pronunciation of the letter within a word. This is also enables the system to easily include double consonants providing a single sound, such as "sh". The disclosed system has selected 26 consonant letter sounds and letter-sound symbols as the first group of letter sounds and letter sound symbols to teach. They are: b, c, d, f, g, h, j, l, m, n, p, q, r, s, t, v, w, x, y, z, ch, sh, tr, dr, th or th. Children can use these 26 consonant letter sounds directly to decode and encode words.

Out of these 26 consonant letter sounds and letter-sound symbols, 20 of them are single-letter letter sounds: b, c, d, f, g, h, l, ,m, n, p, q, r, s, t, v, w, x, y, z. The other 6 consonant letter sounds and letter-sound symbols are formed with two letters: ch, sh, tr, dr, th(ank), and th(e). Among these 6 double-letter consonant letter sounds and symbols, "ch" and "sh" cannot be separated. Even though "tr" and "dr" can be separated, since they are used together to make one sound, they are taught as one sound. "Th" is one form with two different pronunciations, and is therefore counted as 2 sounds.

Out of these 26 consonant letter sounds, there are nine (9) sounds that have more than one symbol to represent their sounds. They are c, f, g, j, n, r, s, w, sh. "C" can also be written as k (key), ck (sick), and ch (Christmas). "F" can also be written as ph (phone). "G" can be written as gu (guest, guess), as gh (ghost). "J" can be written as dge (badge), and as g if g happens to be in front of e, i, and y (gender, giant, gypsy). "N" can be written as kn (knee), as gn (gnaw). "R" can be written as wr (write). "S" can be written as ps (psychology), as c if c happens to be followed by e, i, y (cell, city, cycle). "W" can be written as wh (when). "Sh" can be written as ti, si ci (tion, sion, cian).

The disclosed system has also selected 18 vowel letter sounds and letter-sound relationships as the second group of letter sounds and letter-sound symbols to teach. They are 5 short vowels: a (at), e (egg), i (itch), o (octopus), u (usher); 5 long vowels: a (aid), e (eat), i (idle), o (old), u (use); and 8 low frequency vowels: ar (arch), or (order), ur (urge), ow ( owl), oo (oose), air (air), ear (ear), oi (oil).

Out of these 18 letter sounds and letter-sound relationships, all of them have more than one way to represent their letter sounds except short vowel "a". For the 4 short vowels, "e" can also be written as "ai" (said), and as ea (bread); "i" can be written as y (city); "o" can be written as a (what, want); "u" can be written as o (love), as ou (tough), and as oo (blood, flood).

For the 5 long vowels, "a" can be written as ai (aide), as ay (day), as ey (they), as ea (great, break), as eigh (eight); "e" can be written as ea (eat), as ee (eel), as ey (key), as ei (deceit), as ie (field); "i" can be written as y (sky, why), as igh (light, high), as ie (die, lie), as eigh (height); "o" can be written as o (no, go, so), as oa (oat), as oe (toe), as ow (flow, tow), as ough (dough); "u" can be written as ue (due), as ew (few).

For the rest of the low frequency vowels, ar can be written as a (bath, path, past); "or" can be written as a (ball, tall), as aw (law), as au (Paul), as our (four), as augh (taught), as ough (thought, ought); "ur" can be written as ur (bird), as er (her), as ear (earth), as or (word, work); "ow" can be written as ou (out, our); "oo" can be written as ui (fruit), as u (put), as ew (flew), and as ue (clue); "air" can be written as ear (bear), as are (bare, care); "ear" can be written as eer deer); "oi" can be written as oy (boy, toy).

The first group of sounds taught are the 26 consonant letter sounds. The traditional way of saying these letter sounds is hard for children to learn because there is not a clear auditory pattern among these letter sounds. To solve this problem, the disclosed invention teaches children these 26 consonant letter sounds by attaching a schwa sound to each of them to make pronunciation much easier. (e.g. "buh, cuh, duh, fuh, guh").

The success of this method was verified in tests involving volunteering parents and their children to test if children really find it easier to say these consonant letter sounds with a schwa sound attached. In these tests, all children were around 5 and 6 years old. These children could all say letter names but not letter sounds. When they were presented 26 pictures representing these 26 consonant letter sounds, and were challenged to tell the first letter sounds that they hear in these words, children all naturally added a schwa sound to the 26 consonant letter sounds in English. (e.g. "buh, cuh, duh, fuh, guh, huh, juh, luh, muh, nuh, etc).

More than 48 first graders, near the end of the school term, were asked to say the 26 consonant letter sounds, none of them added the schwa sound. All of the children struggled to pronounce these letter sounds in the way that they were taught. However, when these same students were taught to say the 26 consonant letter sounds with the schwa sound attached, they all learned to say them without any difficulty in two 15 minute sessions in two days.

The above illustrates that using this invention in conjunction with a child's innate language ability, most children can learn to read English with great confidence and efficiency. The disclosed invention dramatically reduces two of the most difficult obstacles that prevent 30% to 40% of English speaking children to learn to read—saying letter sounds and sounding words out.

Every child who does not have speech problems already knows how to say all the letter sounds. The oral vocabulary children use when they go to school is between 4000 and 24000. They do not need to be taught to say these sounds, only to be challenged to say these sounds to increase their awareness to use them consciously in decoding.

To teach children letter sounds with the schema sound added, the disclosed system generally classifies children into two groups. One being preschool children who have not been taught to say letter sounds in the traditional manner. The children who have been in school and have already been taught to say the letter sounds in the traditional manner.

To teach preschoolers, the disclosed system selected 26 pictures that would be familiar to preschoolers. These pictures, representing the 26 beginning consonant sounds, were organized them into 5 groups: (1) balloon, cat, dog, fan, girl; (2) hammer, jet, lion, money, nurse; (3) pencil, queen, rose, saw, turtle; (4) van, wall, fox(x), yo-yo, zigzag; (5) church, ship, tree, dragon, thermometer. These pictures can also be substituted by other age appropriate pictures representative of the 26 sounds. First, the children are asked to go through these pictures and indicate whether they know the names of all these pictures. If they do, they are asked to say the name of the first picture, i.e. balloon. After the children say the word, they are asked to say the first letter sound that they hear in the word "balloon". This approach is then repeated with the other four letter sounds in the same group. The children are then asked to say the 5 consonant letter sounds within this group without saying the names of these pictures. Once they can say the five consonant letter sounds they are asked to repeat these sounds a little faster and faster. Once one group is successfully learned, the method is repeated using the next group of 5 letter sounds. This procedures is repeated until all 26 letter sounds are learned.

To teach school children who have already been taught letter sounds in the traditional way, the child is told that they can add a schwa sound to each of the 26 consonant letter sounds to make the letter easier to say. For most children, there is no need to use pictures with the key being to make sure that every child adds the schwa sound.

When ever, child can say the above letter sounds in a very relaxed mode, and recognize the 26 letters or letter combinations that match each sound (phonograms), they can be taught to pay special attention to the 9 phonograms. These phonograms (c, f, g, j, n, r, s, w, and sh) have more than one way to represent that sound. Out of the 17 extra ways to represent these 9 sounds, only 12 of them are necessary for beginner readers. They are k (key), ck (pick), ph (phone), gu (guess), gh (ghost), g (e, i, y) (gender, giant, gypsy), dge (pledge), kn (knee), gn (gnaw), wr (write), c (e, i, y) (cell, city, cycle), wh (what).

Once children have learned all the necessary consonant phonograms, they are ready to learn the vowel sounds and their phonograms. Children can be taught to be familiar with the 18 vowel sounds first through little rhymes. Then they can be taught to learn the 18 vowel letter sounds and their phonograms using pictures just like they learned the 26 consonant letter sounds and their phonograms. Again, to teach children the 18 vowel letter sounds and their matching phonograms, the disclosed system selected 18 pictures representing the 18 vowel letter sounds and their phonograms: apple, elephant, igloo, operator, umbrella, ace, eagle, island, open, unicorn, arch, orbit, earth, ouch, moose, airplane, ear, and oil. Again, other age appropriate pictures can be substituted. The 18 vowel sounds are taught using the same approach as set forth above.

It is not necessary for children to learn all the 18 vowels prior to decoding words using the disclosed system. Children can begin to decode and read words as soon as they learn even just one vowel letter sound and recognize the phonogram that represents that sound. The disclosed system organizes more than 1800 words according to the order of the 18 vowels. The first 10 vowels are organized according to their position in the alphabet. Thus for every vowel they learn, short vowel or long vowel, they are guaranteed to be able to read all the single syllable words with that vowel letter sound and all the syllables in the great majority of multi-syllable words with that vowel letter sound.

Part II—Sound Units and Decoding

A. Problems of the Blending Approach

A weakness of the traditional way of teaching phonics is to ask children to sound words out. Sounding words out has problems that contribute directly to many children's reading difficulties.

The biggest problem of the blending (sounding out) approach is its failure in discriminating between blendable and unblendable letter sounds. There is a great distance between repeating each single letter sound and saying a word as it should be. Unless children can figure out how to blend the blendable letter sounds into uninterrupted sounds, saying the sound of each spelling will not be much of a help in their efforts in decoding words.

It is also extremely inefficient and troublesome for a child to repeat the letter sound of every letter several times in order to decode a word. Young children do not have a long attention span that by the time they come to the letter sound of the last letter in a word, they may have already forgotten how they pronounced the first one. Many children feel discouraged or simply give up when they do not see immediate success in order to continue with reading lessons.

Further, if that word is not in the child's oral vocabulary, the child is never sure whether the word has been decoded correctly. And finally, the sounding out approach quickly collapses when it comes to more complicated multi-syllable words. For many children their short-term memory simply cannot sustain that many separated, single letter sounds, long enough in order to process them to get to the correct pronunciation of a word.

B. Understanding the Internal Structure of Words

To solve these problems, the disclosed system teaches children that not all letter sounds in a word are equally important. In the disclosed embodiment, a crown 12 is used to identify the vowels in a word, such as Dad in FIG. 1. The crown is used to tie the vowel to being the king because they dictate the sound a word or syllable takes. Other relationships can also be used to emphasize the sound dominance of the vowel. Further, not all consonants in a word are equally important. The consonant that goes right before the vowel is the highest ranking consonant among all the consonants in a single syllable word. These consonants can be described as a vowel's right-hand man 14 of FIG. 2. Children are also taught that not all letter sounds are blendable. Only a vowel 12 and the consonant 14 that goes right before it can be blended into a uninterrupted new sound, as shown in FIG. 3. The combination of the vowel 12 and preceding consonant letter sound 14 is called a sound unit 16 and is taught as the "brain" of a single syllable word. The child is also taught that if the sound unit 16 in a word is pronounced correctly, he/she will pronounce the word correctly.

In the disclosed system, children do not address reading words until they have learned how to put sound units 16 together. Once they have learned how to say sound units 16 as easily as they can say each individual letter sound, they can add whatever necessary ending and beginning letter sounds to those sound units to decode or encode virtually any word they like.

Figure 1:
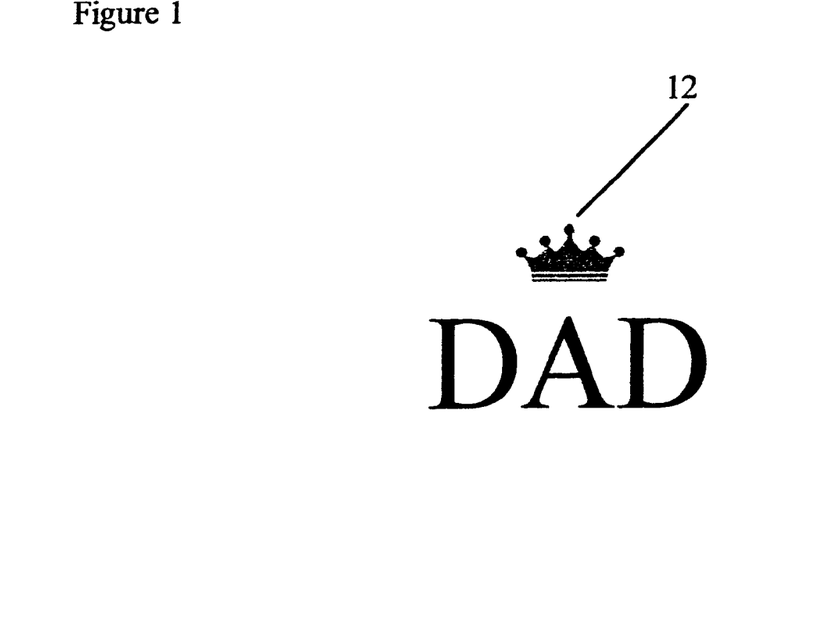
FIG. 1 illustrates the controlling role of vowels in words.
Figure 2:
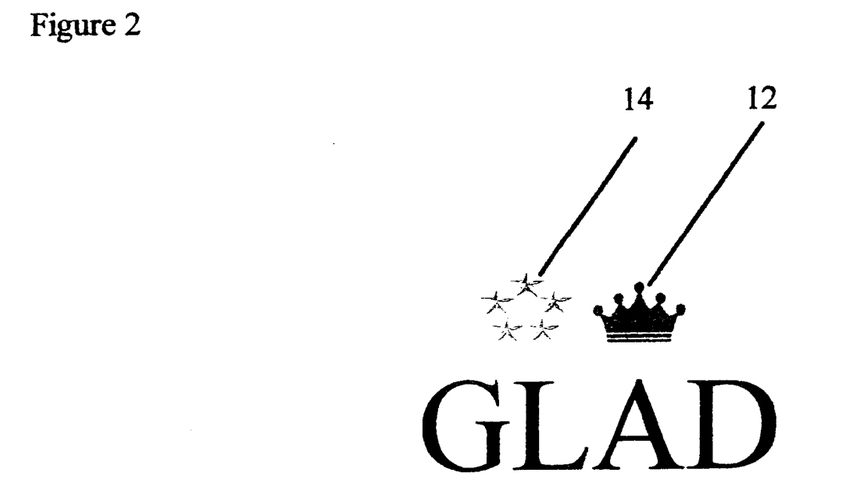
FIG. 2 illustrates the critical role the consonant in front of the vowel plays in words.
Figure 3:
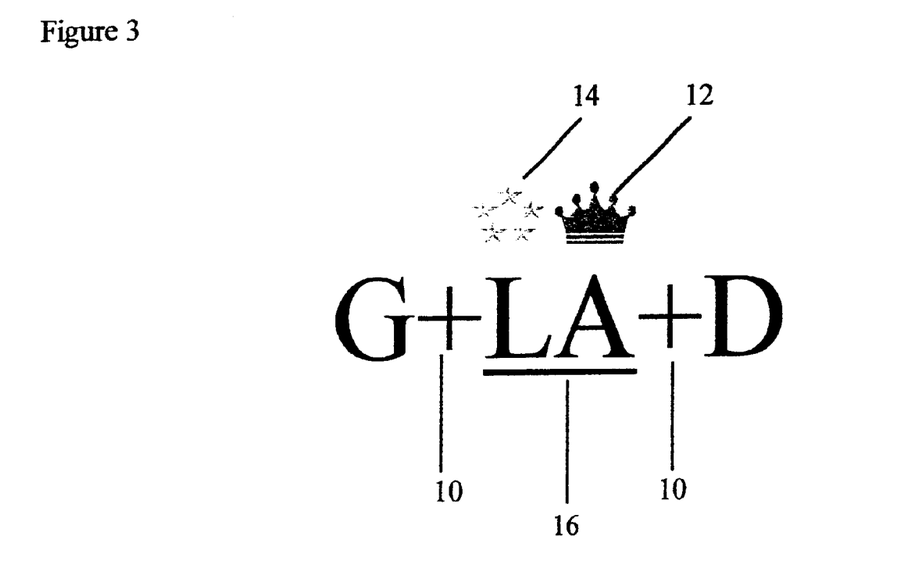
FIG. 3 illustrates the relationship between the vowel in a single syllable word and its preceding consonant.
Figure 4:
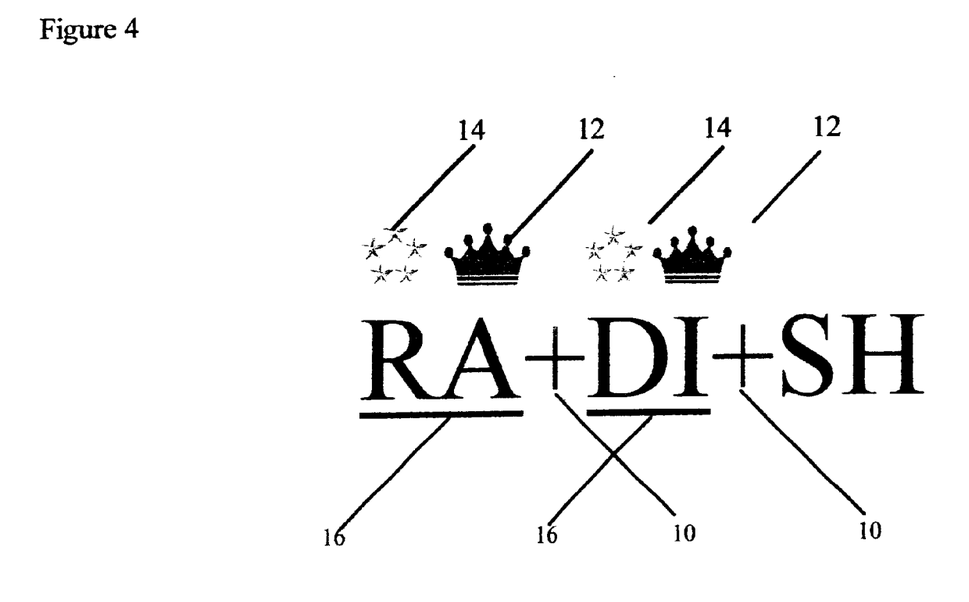
FIG. 4 illustrates how sound units and individual letter sounds make up multi-syllable words.

Once the child is comfortable with reading single syllable words, such as illustrated in FIGS. 1–3, multi-syllable words are addressed. Children are taught that it is the same sound units 16 that they use in decoding single syllable words form multi-syllable words (See FIG. 4).

Except for the below exception, when identifying and teaching sound units, a key rule is not to attach any consonants to the end of a sound unit. It is of absolute importance to keep a sound unit clean. The exception is the 5 short vowels and the consonant letter "n" and "ng". Physically, "n" and "ng" can be attached to any of the 5 short rowels to form an, en, in, on, un, and ang, ing, ong, ung, and still be combined with any of the 26 consonant letter sounds to form an uninterrupted sound.

C. The Uniqueness of Sound Units

Figure 5:
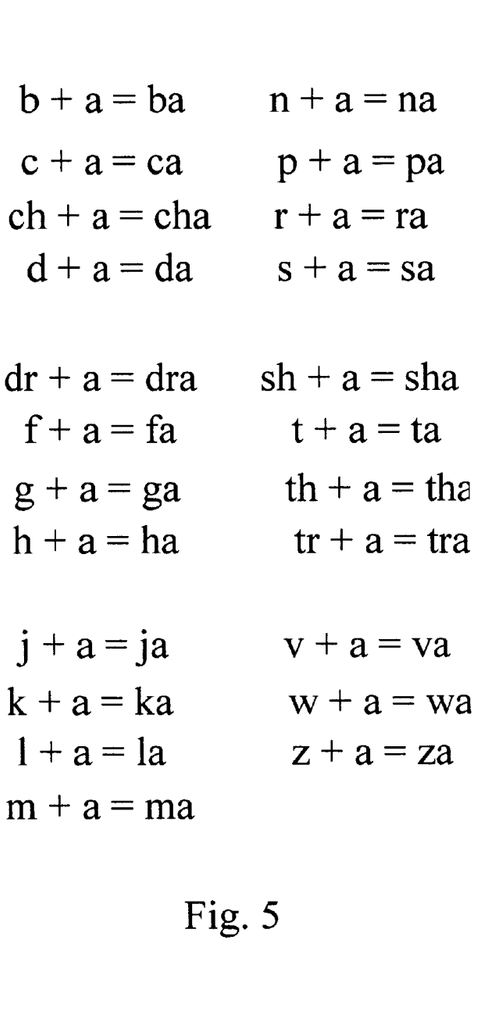
FIG. 5 is a sample of how to process vowels and their preceding consonants into sound units.

Several factors make sound units unique. First, they are limited in numbers. For example, with the short vowel letter sound "a", there are only 24 consonant and vowel combinations which can be classified as sound units (FIG. 5).

Second, they are constant in nature. It does not matter how many thousands of words can be made by the short vowel letter sound "a", these 24 sound units will always remain the same like "ba" in bad, back, batter, battle, batch, etc.

Third, they provide children with a necessary transition from being able to sax each individual letter sound to actually decoding words. From being able to say each letter sound to being able to use these letter sounds to decode words can prove to be insurmountable to many children. Yet from being able to say each letter sound to being able to blend a vowel and its preceding consonant together to create a sound unit, is a easy and logical step that every child can take.

Fourth, when blendable letter sounds are processed into ready-to-use sound units, beginning and ending consonant letter sounds can simply be added to these sound units to decode and encode all kinds of words. Automacity in decoding with such an approach becomes a reachable reality for every child.

Finally, the disclosed process does not require children to learn over 100 blends in order to learn to read due to the use of sound units. The 9 consonant letter sounds (b, c, f, g, p, s, t, sh, th) that are used as very beginning consonant letter sounds and form blends with other consonant letter sounds are simply added to sound units with their ending consonant letter sounds. For example, in the word "splash", "s" and "p" are added to the sound unit "la" just like the ending consonant "sh".

D. Using Sound Units to Decode Single Syllable Words

Two things can be done to further facilitate the disclosed reading method. In terms of organization, first, words in each unit should be organized around no more than one vowel letter sound, be it short vowel or long vowel. Second, words in each lesson should be organized around no more than a few word families (e.g. "–ag, –ap, ad"). Third, each unit should begin with a sound unit page where a child can process individual letter sounds into ready-to-use sound units. Fourth, in the first part of each lesson, all words should be separated on purpose in the sequence of: (a) very beginning consonants if a word has one, (b) sound units, (c) ending consonants. These three parts are separated by the sign "+" (e.g. "g+la+d"). In the second part of each lesson, words should be written as they are (e.g. "glad").

In terms of instruction, when starting a new unit, a child should first work on the sound unit page where individual letter sounds are processed into sound units. Second, when starting a lesson, a child should do the first part of each lesson where words are separated according to the sequence of (a) beginning consonants, (b) sound units, and (c) ending consonants. In this part of the lesson a child should simply say each beginning consonant letter sound, sound unit, and ending consonant letters sound to decode the words rather than elaborate on each individual sound. Third, only when a child can decode the separated words comfortably, should they proceed to the second part of the lesson. If a child still struggles with the words, the sound unit page should be reviewed until the child is totally automatic with the pronunciation.

Thus, each step is built on a prior accomplishment, making the progress appear incremental while achieving rapid advancement in reading ability.

E. Using Sound Units to Decode Multiple Syllable Words

Once children have completed working with 18 vowel letter sounds and their corresponding single syllable words they have already laid a solid foundation for decoding multiple syllable words. The procedures disclosed above is repeated, on a more rapid basis, for the multi-syllable words to build the child's confidence in tackling the larger words.

Part III—Word Wheels and Encoding

In teaching children to learn to read, one difficulty has been in providing young children with simple, efficient, and frequent experiences and practices in manipulation of letters to form words. A child is much more likely to practice putting letters together to make words with easer to use tools. However, due to children's limited development of fine motor skills in handling pens, pencils or even keyboards, this other solutions were required to solve the problem. To help children have the experience of manipulating letters and words, there are many letter cards and word cards in the market. Yet such approach is messy, inefficient, and very disorienting to many children. In the Wilson Reading Program, for example, to learn to decode multisyllable words, children not only have to deal with hundreds of word cards, they also have to cut those word cards into more cards according to their syllables. To solve such a problem, the disclosed system created the word wheels.

Figure 6:
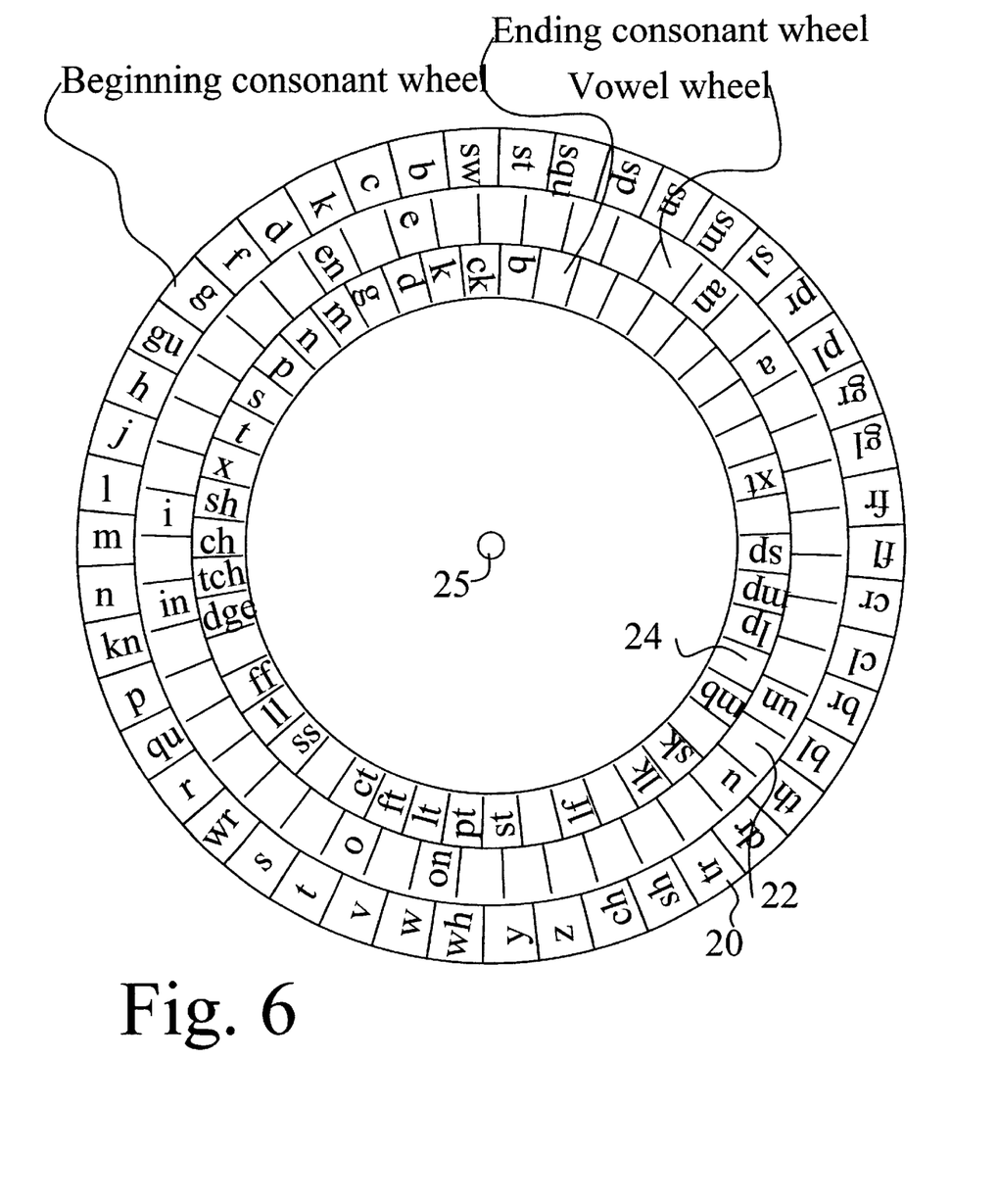
FIG. 6 is a top view of a three tiered, rotating wheel for creating short vowel word wheels.

In terms of the combination of wheels, in general, there are three, four and five wheel word wheels. A flat, three tier word wheel 18 is illustrated in FIG. 6 that incorporates a consonant base wheel 20, a middle vowel wheel 22 and an ending consonant inner wheel 24. The disclosed flat word wheels are unique in that they use not only single, but combined consonant, sounds in both the beginning and ending consonants. In the wheel 18 illustrated in FIG. 6, the beginning consonant wheel 20 includes b, c, d, f, g, gu, h, j, l, m, n, kn, p, qu, r, wr, s, t, v, w, wh, y, z, ch, sh, tr, dr, th, bl, br, cl, cr, fl, fr, gl, gr, pt, pr, sl, sm, sn, sp, squ, st, and sw. The vowels a, an, e, en, I, in, o, on, n, and un are placed on the center, vowel wheel 22. The ending consonant wheel 24 includes the consonant and consonant combinations of b, ck, k, d, g, m, n, p, s, t, x, sh, ch, tch, dge, ff, ll, ss, ct, ft, lt, pt, st, lf, lk, sk, mb, lp, mp, sp, and xt. The beginning consonant wheel 20, vowel wheel 22 and ending consonant wheel 24 are secured together at rotatable center point 25, enabling the user to rotate the wheels in relation to one another to form words.

Figure 7:
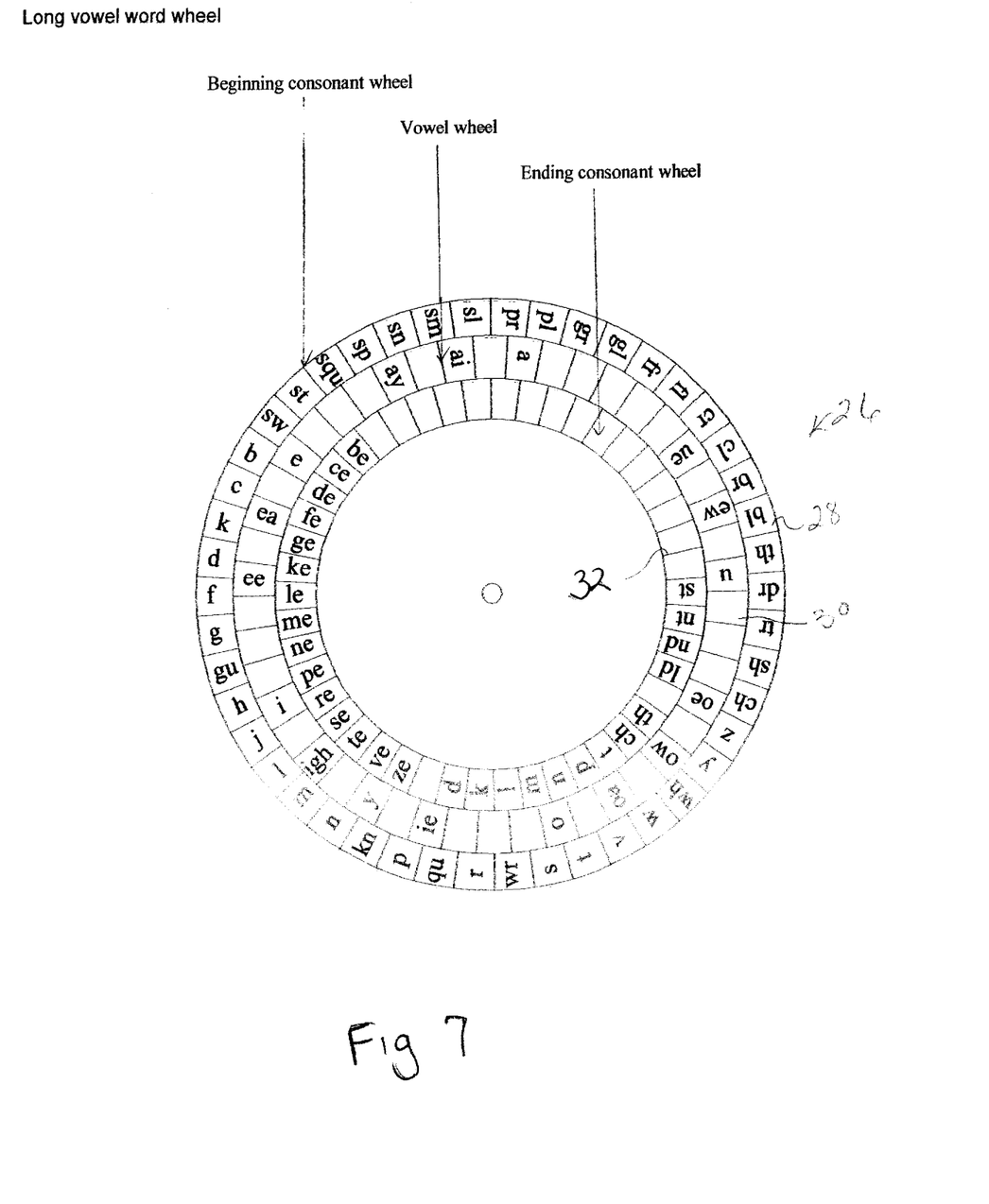
FIG. 7 is a top view of a set of three tiered, rotating wheels that can be used to create long vowel word wheels.

A flat, three tiered word wheel 26 is illustrated in FIG. 7 that incorporates a beginning consonant base wheel 28, a vowel wheel 30 and an ending consonant inner wheel 32. The beginning consonant base wheel 28 uses b, c, k, d, f, g, gu, h, j, l, m, n, kn, p. qu, r, wr, s, t, v, w, wh, y, z, ch, sh, ct, dr, th, bl, br, cl, cr, fl, fr, gl, gr, pl, pr, sl, sm, sn, sp, squ, st, and sw. The long vowel wheel 30 contains the vowels a, ai, ay, e, ea, ee, i, igh, y, ie, o, oa, ow, oe, u, ew, and ue. The ending consonant wheel 32 uses the ending consonant and consonant combinations be, ce, de, fe, ge, ke, le, me, ne, pe, re, se, te, ve, ze, d, k, l, m, n, p, t, ch, th, ld, nd, nt, and st. As described in conjunction with FIG. 6, these wheels are rotatable in relation to one another, enabling the user to easily for words.

Figure 8:
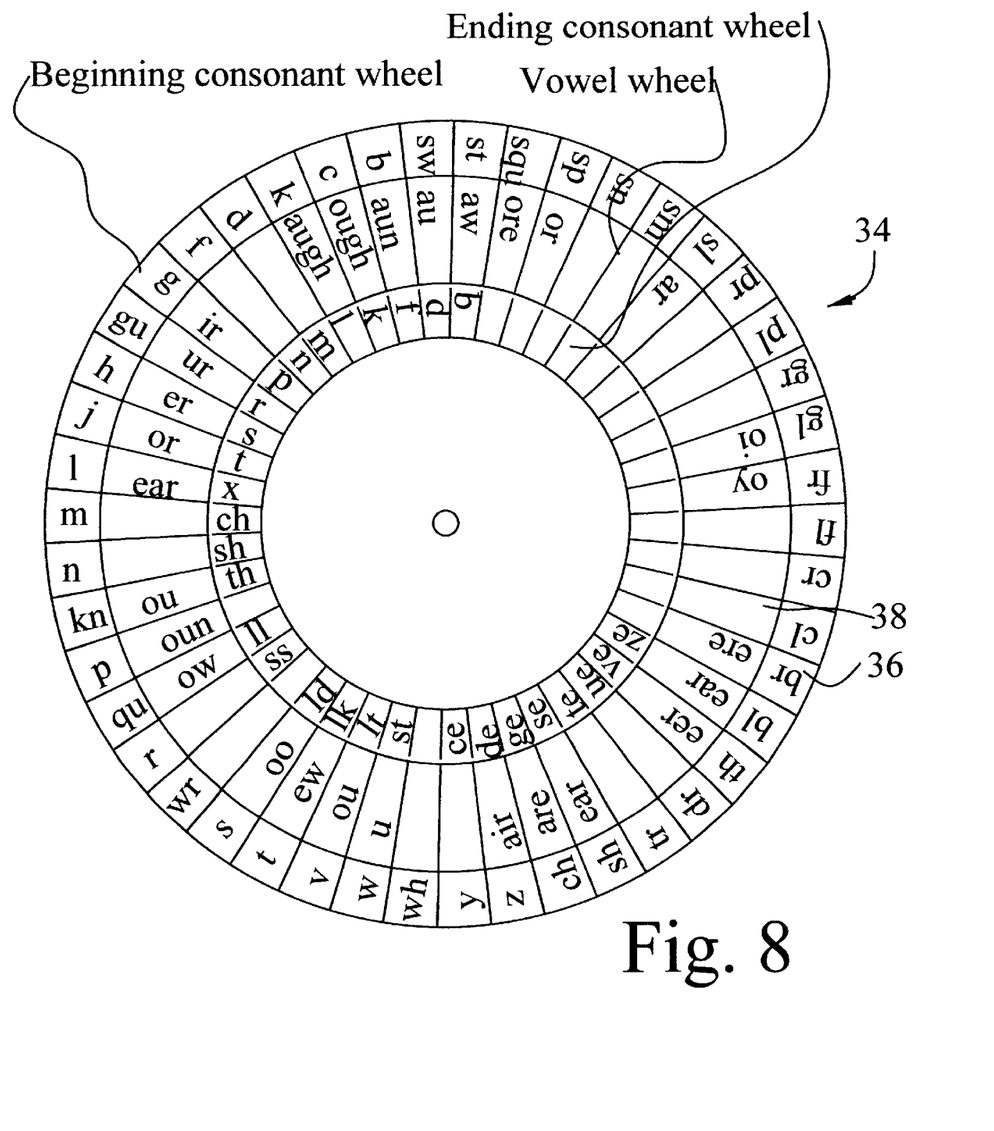
FIG. 8 is a top view of a set of three tiered, rotating wheels that can be used to create regular vowel word wheels.

A flat, three tiered word wheel 34 is illustrated in FIG. 8 for teaching words containing the regular vowel sounds. The outer single and combination consonant wheel 36 has the letters b, c, k, d, f, g, gu, h,j, l, m, n, kn,p, qu, r, wr, s, t, v, w, sh, y, z, ch, sh, tr, dr, th, bl, br, cl, cr, fl, dr, gl, gr, pl, pr, sm, sn, sp, squ, st, and sw. The single and combined vowels in this example are ar, or, ore, aw, au, aun, ough, augh, ir, ur, er, or, ear, on, oun, ow, oo, ew, on, u, air, are, ear, eer, ear, ere, oy, and oi. The inner consonant wheel 40 consists of b, d, f, k, l, m, n, p, r, s, t, x, ch, sh, th, ll, ss, ld, lk, lt, st, ce, de, ge, se, te, ue, ve, and ze.

It should be noted that in some instances vowel or vowel combination can be repeated to enable more than one word to be formed at a time.

Figure 13:
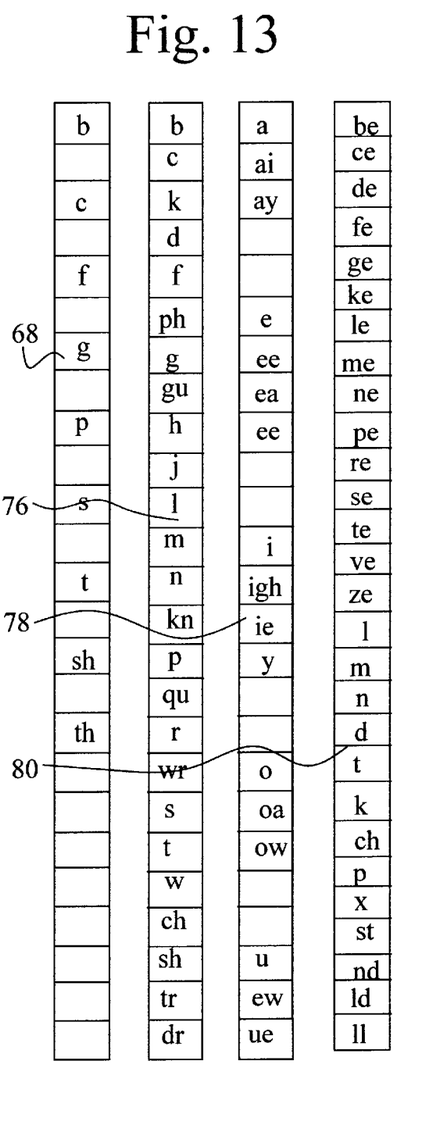
FIG. 13 illustrates four columns of letters for a four-part word wheel for the five long vowels.
Figure 14:
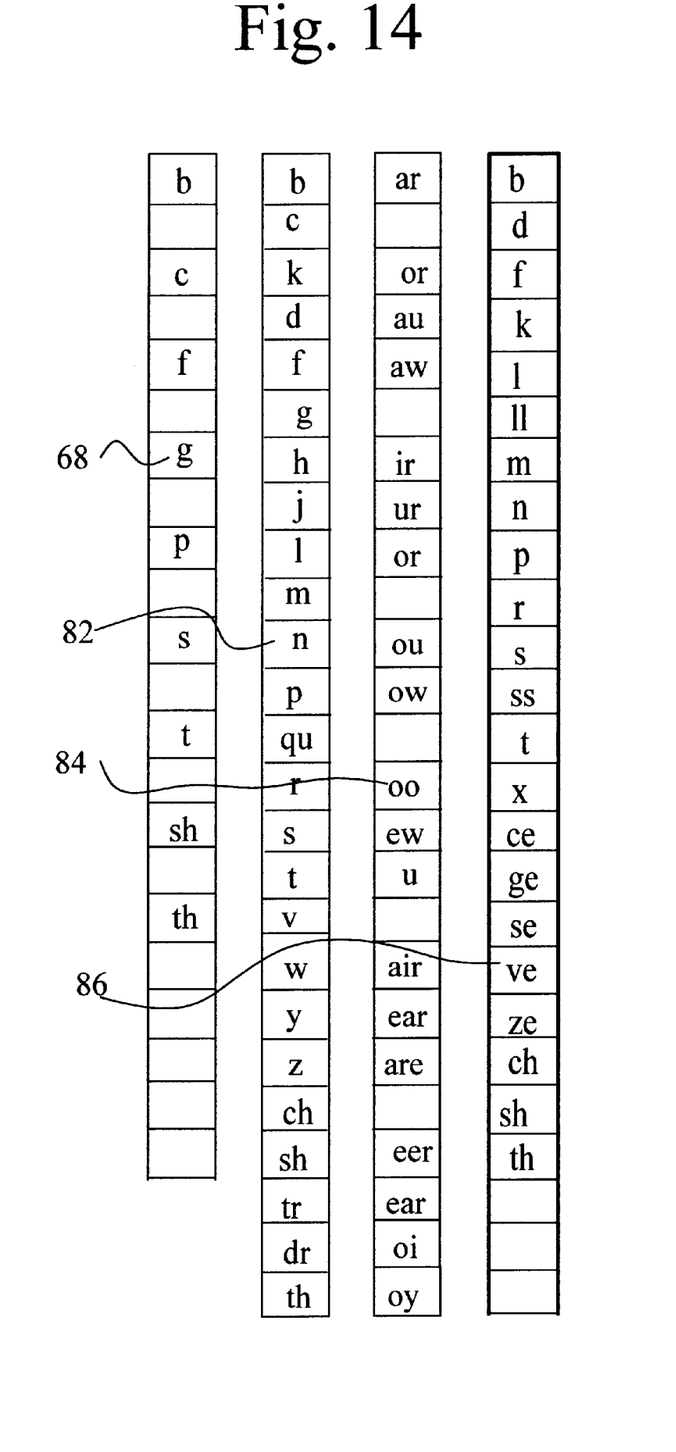
FIG. 14 illustrates four columns of letters for a four-part word wheel for the eight regular vowels.

Other examples of the placement of letters for a three-wheel word wheel is illustrated in FIGS. 13 and 14. FIG. 13 is a simplified version of letters on a three-wheel word wheel for the five short vowels. The first column 58 contains letters to be placed on the blendable consonant letter sound wheel. The second column 60 contains letters to be placed on the vowel wheel. The third column 62 contains letters to be placed on the ending consonant letter sound wheel. FIG. 13 is an example of a simplified version, with the vowel wheel containing only five short vowels without letter "n" controlled shortcuts like "an", "en", "in", "on" or "un". The letters on the ending consonant letter sound wheel are also fewer than the ones shown in FIG. 14. It is intended for very young children who are just beginning to learn to read.

FIG. 14 contains the letters for a regular three-wheel word wheel for the five short vowels. The second column 64 contains not only the five short vowels but also the letter "n" controlled shortcuts like "an", "en", "in", "on" or "un". The third column 66 contains letters to be placed on the ending consonant letter sound wheel. This wheel can be used for children in preschool or kindergartens. An exploded view of the three part wheel is illustrated in FIG. 25.

Figure 12:
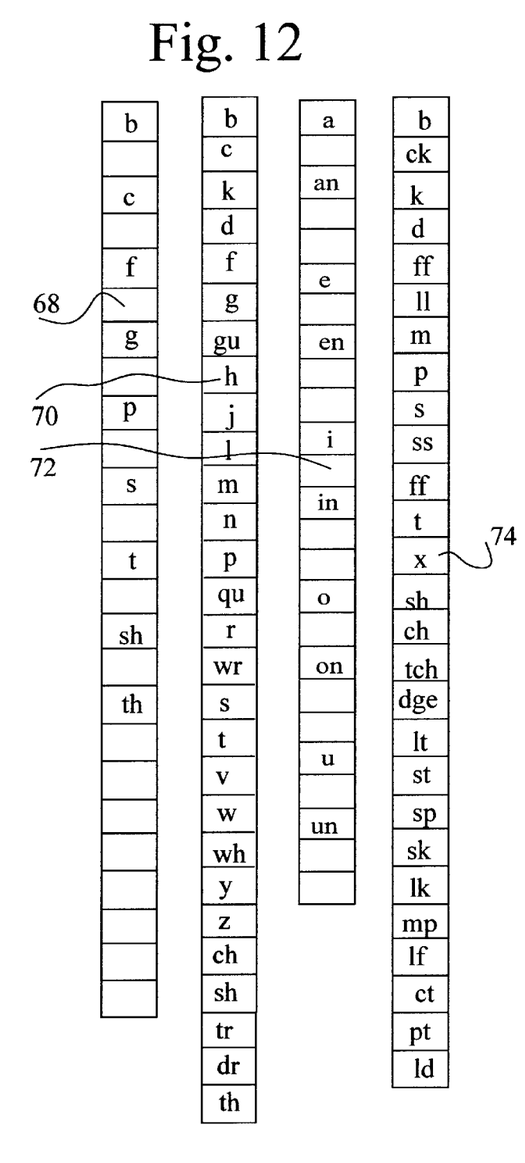
FIG. 12 illustrates four columns of letters for a four-part word wheel for the five short vowels.

Examples of the placement of the letters for a four-wheel word wheel are illustrated in FIG. 12, 13, and 14. In FIGS. 12 and 13, the second half of the two ending consonant columns contain some consonant blends (e.g. sk, st, ld, etc). FIG. 12 contains four columns of letters for a full scale four wheel word wheel for the five short vowels. The first column 68 contains letters to be placed on the beginning consonants wheel. The second column 70 contains letters to be placed on the blendable consonants wheel. The third column 72 contains letters to be placed on the vowel wheel. The fourth column 74 contains letters to be placed on the ending consonant wheel.

FIG. 13 contains four columns of letters for a full scale four part word wheel for the five long vowels. The first column 68 contains letters to be placed on the beginning consonants part of the wheel. The second column 76 contains letters to be placed on the blendable consonants part of the wheel. The third column 78 contains letters to be placed on the vowel portion of the wheel. The fourth column 80 contains letters to be placed on the ending consonant section of the wheel.

Figure 18:
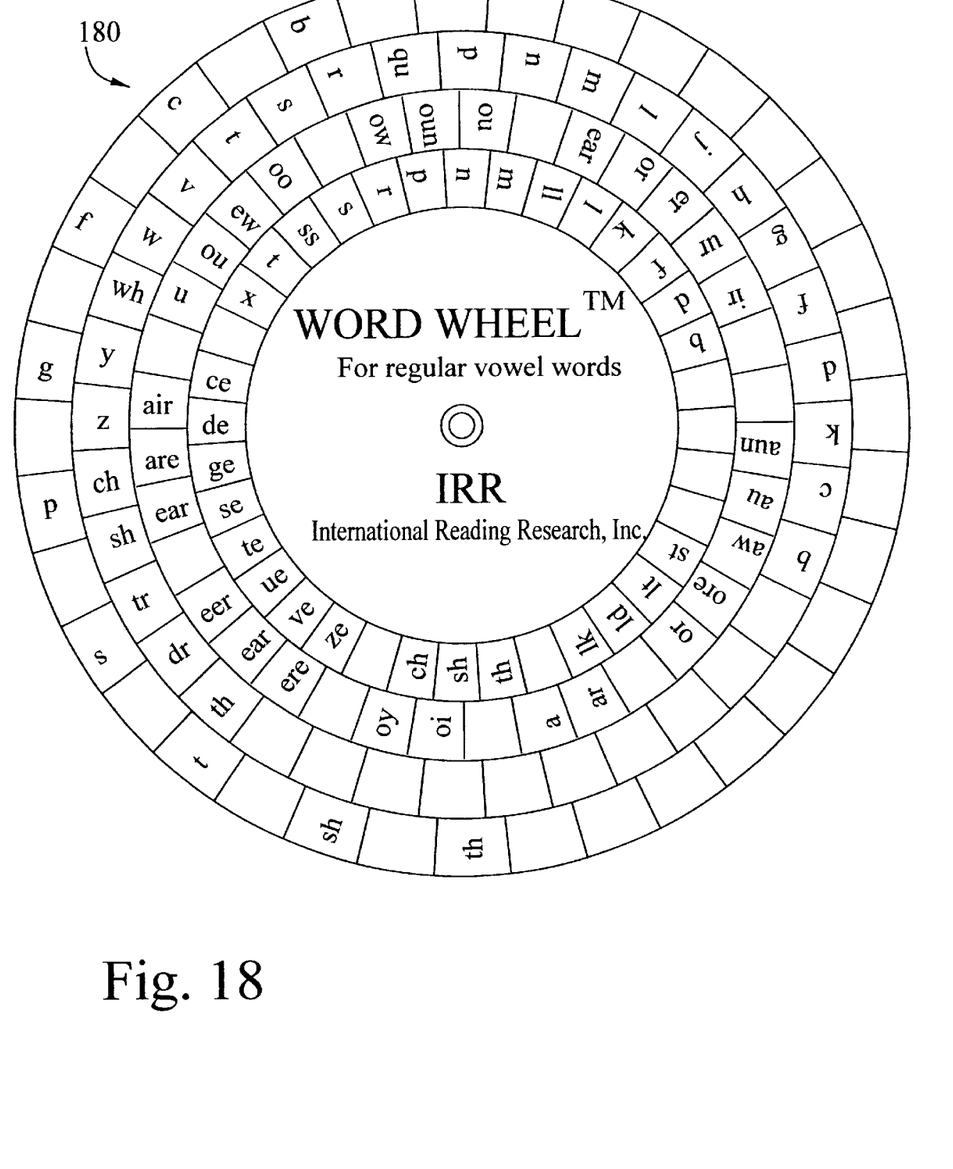
FIG. 18 is a flat, five-part word wheel.

FIG. 14 contains four columns of letters for a full scale four part word wheel for 8 regular vowels. The first column 68 contains letters to be placed on the beginning consonant wheel. The second column 82 contains letters to be placed on the blendable consonant wheel. The third column 84 contains letters to be placed on the vowel wheel. The fourth column 86 contains letters to be placed on the ending consonant wheel. An addition example of letter placement is illustrated in the flat, five part wheel 180 of FIG. 18.

Figure 15:
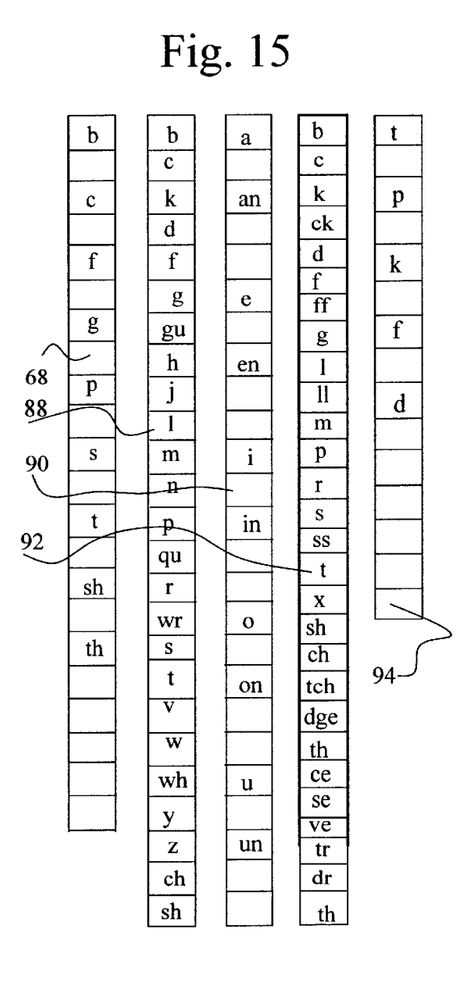
FIG. 15 illustrates five columns of letters for a five-part word wheel for the five short vowels.
Figure 16:
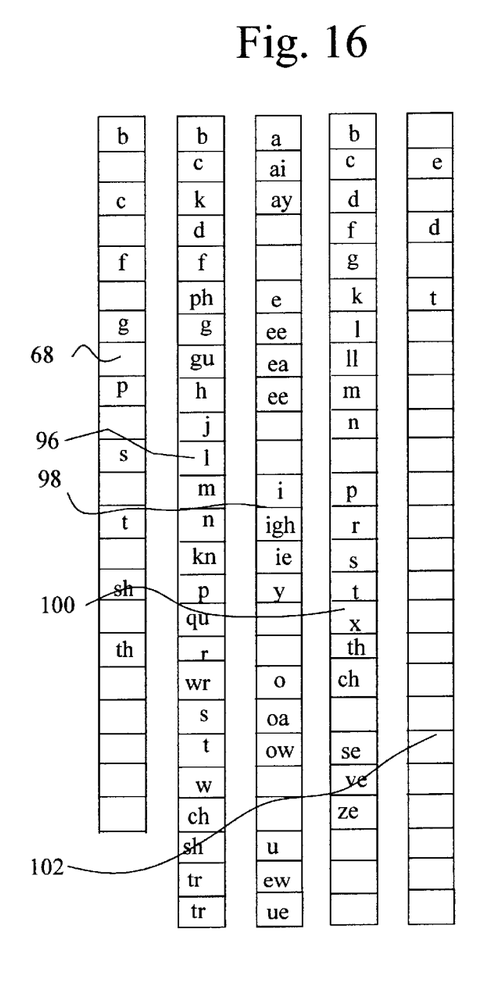
FIG. 16 illustrates five columns of letters for a five-part word wheel for the five long vowels.

The placement of the letters for the five part word wheels is illustrated in FIGS. 15 and 16. Letters that make up words containing the five short vowels or the five long vowels also can be laid out on the five part wheels, in which case, there will be no consonant blends on either of the two ending consonant wheels (e.g. sk, st, ld, etc).

FIG. 15 contains five columns of letters for an example full scale five part word wheel for the five short vowels. The letters in the first three columns 68, 88, and 90 are no different from the first three columns in regular four part word wheels for the five short vowels. The fourth column 92 contains letters to be placed on the first ending consonant wheel, except that there are no consonant blends. The last column 94 contains letters to be placed on the second ending consonant wheel.

FIG. 16 contains five columns of letters for an example, full scale five part word wheel for the five long vowels. The letters in the first three columns 68, 96, and 98 are no different from the first three columns in regular four part word wheels for the five long vowels. The fourth column 100 contains letters to be placed on the first ending consonants wheel, except that there are no consonant blends. The last column 102 contains letters to be placed on the second ending consonant wheel.

The flat word wheels as illustrated in FIGS. 6, 7, 8, 17 and 18 can be manufactured from a heavy-duty paper, coated paper or plastic. Each of the wheels must be decreasing in size to enable clear viewing of the periphery of the prior wheel. It should be noted that the combinations of consonants and vowels illustrated is not all inclusive and additional combinations will be evident to those skilled in the art. The uniqueness to the disclosed word wheels is the use of combined vowel and consonant sound units. The use of sound units enables the user to divide out and read the word as it is pronounced.

Figure 9:
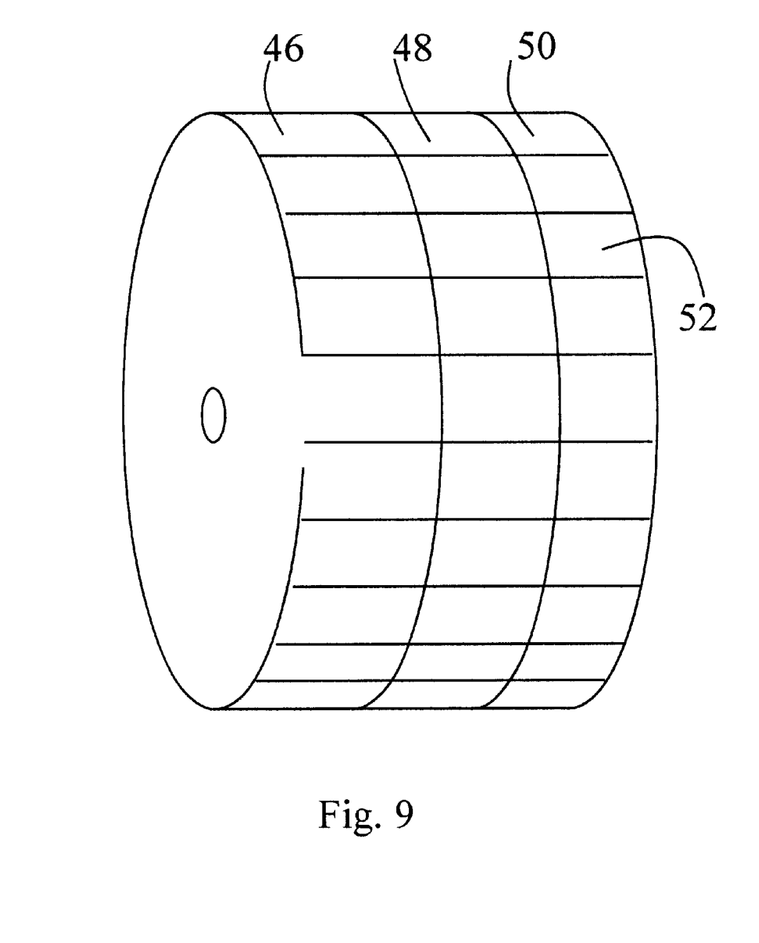
FIG. 9 is a perspective view of a 3-D, smooth surfaced, circular three part wheel that can be used to create word, math, and sorting wheels.
Figure 10:
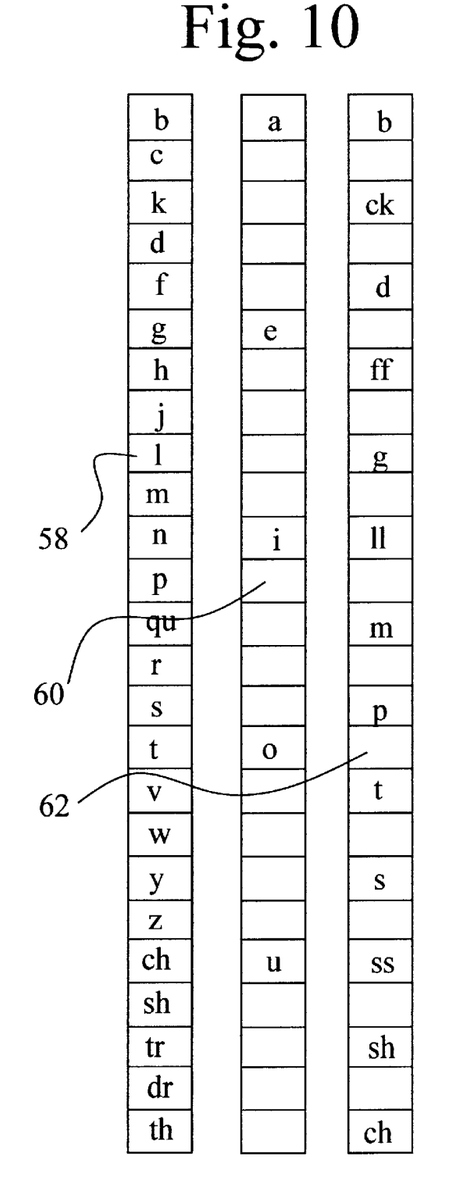
FIG. 10 illustrates the three columns of letters on a simplified three-wheel word wheel for the five short vowels.
Figure 11:
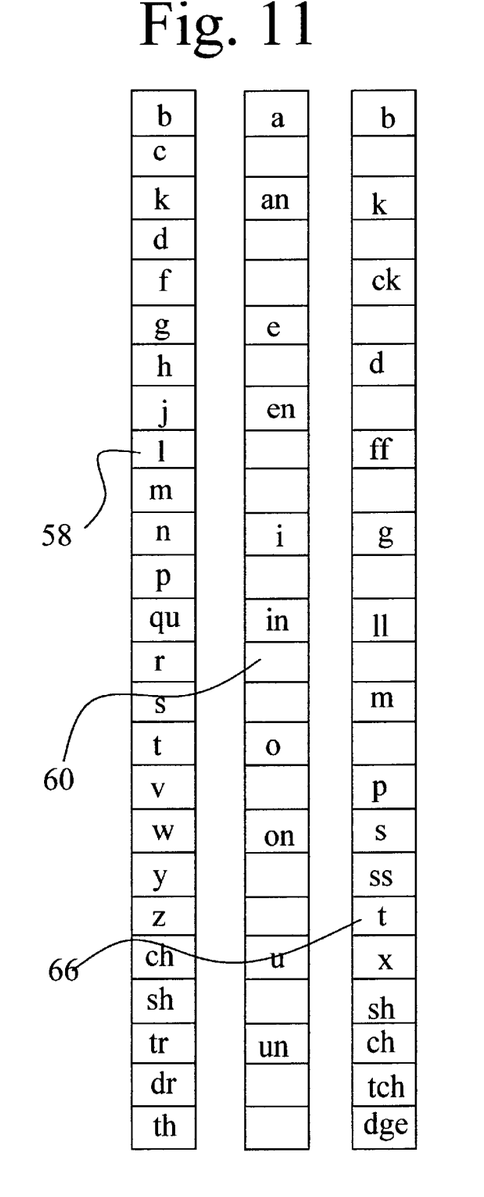
FIG. 11 illustrates the letter placement on a standard three-wheel word wheel for the five short vowels.

FIG. 9 is the drawing of a 3-D circular three wheel word wheel 34. The first wheel 36 contains the blendable consonants 36, the middle is the vowel wheel 38 and the consonant wheel 40 has the ending consonants.

Figure 17:
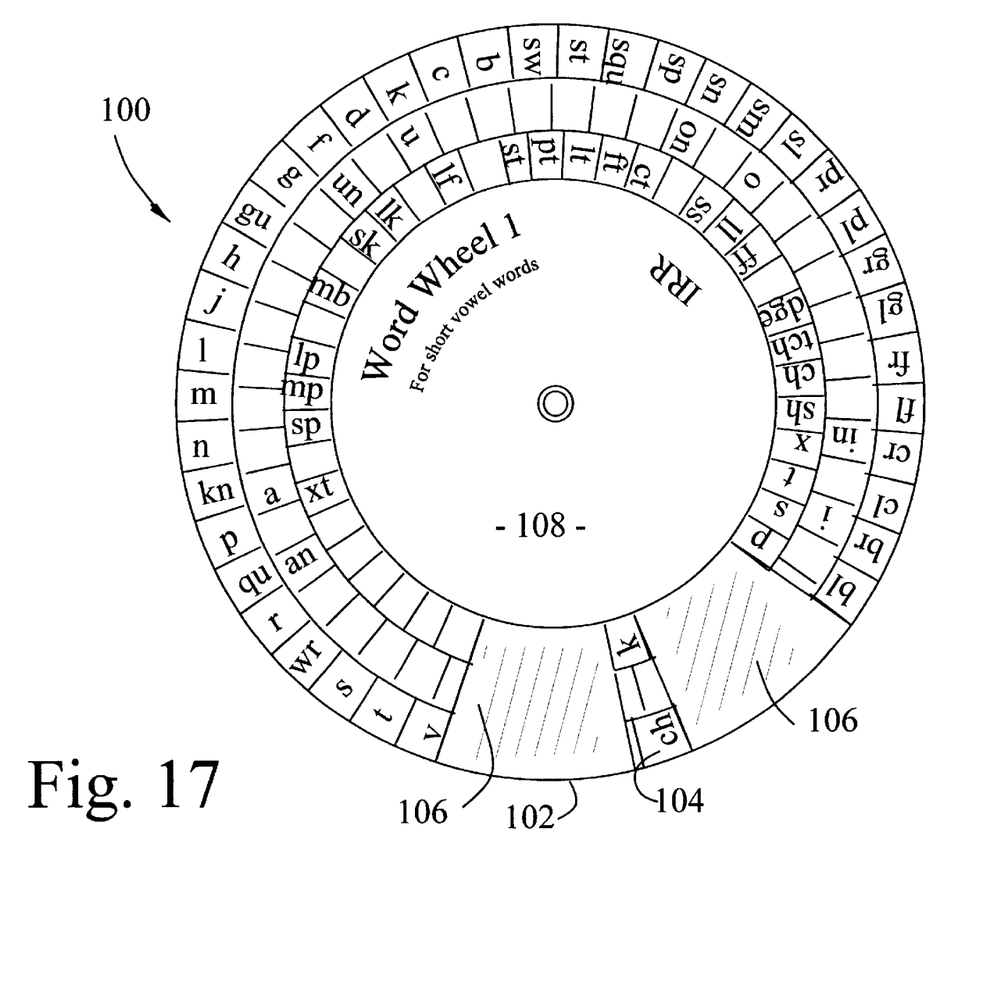
FIG. 17 illustrates to top view of a word wheel having a word shield.

FIG. 17 illustrates the word wheel 100 that incorporates a word shield 102. The word shield 102 is a portion of an inner fourth wheel 108 that has a shielding portion 106 that block a portion of the letters on either side of the viewing strip 104. This enables the user to isolate the letters forming the words, thereby removing some of the confusion with reading across or lining up the wheels.

Part In—Math Wheels and Sorting Wheels

The same concepts that govern the word wheels also work with math wheels and sorting wheels. For young children, to be able to do simple adding, subtracting, multiplication, and division quickly and automatically will lay the foundation for their later success with math. A current problem for teaching math to young children is how to keep a balance between giving them enough practice and while not requiring them to do so many drills. Math wheels can help achieve such a goal. A typical math wheel is not only easy and fun to play with, it also gives a child easy way to do the basic adding, subtracting, multiplication, and division problems over and over again. For example, a simple 18 number adding math wheel will give a child over 300 different ways to arrive at 36 answers.

Further Applications

The disclosed system can also be used in the multimedia arena, through on-line computer services, CD Roms, handheld electronic games, etc. Multimedia provides the advantages of visual and sound to simultaneously reinforce both the appearance and sound of a word.

What is claimed is:

1. A device for teaching the combining of letter sounds to produce a word, said device having a plurality of coaxial rotatable wheels wherein said plurality of wheels includes at least a first wheel, a second wheel, and a third wheel, said wheels being layered and rotatably secured to one another, said second wheel and said third wheel having a sufficiently decreasing periphery thereby permitting viewing of each of said wheel's periphery, each of said plurality of wheels being divided into multiple letter containing sections along said periphery; wherein, a portion of said multiple letter containing sections of said wheels have consonant sounds formed by a single consonant and vowel sounds formed by a single vowel; wherein, at least a portion of said multiple letter containing sections of said first wheel and said third wheel have consonant sounds formed from more than one consonant or a combination of one or more consonants with a silent vowel; and wherein at least a portion of said multiple letter containing sections of said second wheel has vowel sounds formed from more than one vowel or a combination of one or more vowels with one or more consonants, wherein the rotation of said wheels to place said consonant sounds adjacent said vowel sounds forms a word.

2. The device of claim 1 wherein said consonant sounds on said first wheel are taken from the group consisting essentially of, b, bl, br, c, ch, cl, cr, d, dr, f, fl, fr, g, gl, gr, gu, h, j, k, kn, l, m, n, pl, pr, qu, r, s, sh, sl, sm, sn, sp, squ, st, sw, wr, t, th, tr, v, w, wh, y and z.

3. The device of claim 1 wherein said vowel sounds on said second wheel are taken from the group consisting essentially of a, ai, an, ar, ay, augh, or, ore, aw, au, aun, ir, ie, ur, e, ee, en, er, or, ear, ou, oun, ow, oo, ew, ou, ough, u, air, are, ear, eer, ere, oy, oi, i, igh, in, o, oa, oe, on, un, and ue.

4. The device of claim 1 wherein at least a portion of said multiple letter containing sections of said third wheel have consonant sounds formed from more than one consonant, more than one vowel, or a combination of one or more consonants with a silent vowel.

5. The device of claim 4 wherein said consonant sounds on said third wheel are taken from the group consisting essentially of, b, be, ce, ch, ck, ct, d, de, dge, f, fe, ff, ft, g, ge, k, ke, l, ll, lf, ld, le, lk, lp, lt, m, mb, me, mp, n, nd, ne, nt, p, pe, pt, r, re, s, se, sh, ss, sk, st, sp, t, tch, te, th, ue, ve, ze, x, and xt, wherein the rotation of said wheels to place said third wheel consonant sounds adjacent said vowel sounds to form a word ending.

6. The device of claim 1 wherein said first wheel contains forty-six letter containing sections, each of said letter containing sections having at least one letter or a combination of letters.

7. The device of claim 1 wherein said second wheel contains forty-six letter containing sections, a portion of said letter containing sections being blank.

8. The device of claim 5 wherein said third wheel contains forty-six letter containing sections, a portion of said letter containing sections being blank.

* * * * *